(12) United States Patent
Kozaki

(10) Patent No.: US 6,742,391 B2
(45) Date of Patent: Jun. 1, 2004

(54) FEED SYSTEM CONTROLLING METHOD AND APPARATUS FOR MACHINE TOOL

(75) Inventor: Jun Kozaki, Yamatokoriyama (JP)

(73) Assignees: Mori Seiki Co., Ltd., Yamatokoriyama (JP); Intelligent Manufacturing System International, Sacramento, CA (US)

( * ) Notice: Subject to any disclaimer, the term of this patent is extended or adjusted under 35 U.S.C. 154(b) by 0 days.

(21) Appl. No.: 10/214,692

(22) Filed: Aug. 9, 2002

(65) Prior Publication Data

US 2003/0029240 A1 Feb. 13, 2003

(30) Foreign Application Priority Data

Aug. 13, 2001 (JP) .................................. 2001-245152

(51) Int. Cl.[7] .............................................. G05B 19/408
(52) U.S. Cl. ..................................... 73/579; 318/568.22
(58) Field of Search ................... 73/579, 659; 700/177; 318/594, 568.22

(56) References Cited

U.S. PATENT DOCUMENTS

| | | | |
|---|---|---|---|
| 5,170,358 A | * 12/1992 | Delio | 700/177 |
| 5,260,631 A | * 11/1993 | Hayashida et al. | 318/594 |
| 5,886,491 A | * 3/1999 | Yoshida et al. | 318/592 |
| 6,507,165 B2 | * 1/2003 | Kato et al. | 318/611 |
| 2001/0002097 A1 | * 5/2001 | Tsutsui | 318/560 |

OTHER PUBLICATIONS

PCT English abstract of Publication No. WO00/52543 dated Sep. 8, 2000.
Patent Abstracts of Japan Publication No. 2001–157948 dated Jun. 12, 2001.
Patent Abstracts of Japan Publication No. 2001–209434 dated Aug. 3, 2001.

* cited by examiner

*Primary Examiner*—Hezron Williams
*Assistant Examiner*—Rose M. Miller
(74) *Attorney, Agent, or Firm*—Westerman, Hattori, Daniels & Adrian, LLP

(57) ABSTRACT

Control method and control apparatus are capable of preventing vibrations of the feed system and thereby maintaining its optimum operating state for a long run. The control apparatus (1) includes an operation command generator (3) for generating an operation command signal according to an NC program, a position controller (4) for generating a speed command signal by multiplying a deviation between an operation command signal and a current position signal by a positional loop gain, a speed controller (5) for generating an electric-current command signal by multiplying a deviation between a speed command signal and a current speed signal by a speed loop gain, a filtering processor (6) for eliminating frequency components of a predetermined frequency band from the electric-current command signal, and adjusting processor (20) for adjustment of the elimination frequency band in response to the detected vibration level and vibrational frequency.

6 Claims, 3 Drawing Sheets

FEED SYSTEM CONTROLLING METHOD AND APPARATUS FOR MACHINE TOOL

BACKGROUND OF THE INVENTION

1. Field of the Invention

The present invention relates to control method and apparatus for controlling a machine tool feed system. More specifically, the invention relates to control method and control apparatus capable of effectively suppressing vibrations that occur in the feed system.

2. Description of the Prior Art

Typically, a feed system for an NC machine tool is controlled based on an operation command signal generated according to an NC program as well as a current position signal and a current speed signal fed back from the feed system. In more detail, an operation command signal is generated according to an NC program, and a speed command signal is generated by multiplying a deviation between the generated operation command signal and a current position signal fed back from the feed system by a positional loop gain. Then, an electric-current command signal is generated by multiplying a deviation between the generated speed command signal and a current speed signal fed back from the feed system by a speed loop gain, and the drive motor of the feed system is controlled based on the generated electric-current command signal.

Since the speed loop gain largely affects the responsivity of the feed system, there is a need for increasing the speed loop gain in order to implement a high-speed, high-precision feed system. On the other hand, excessively increasing the speed loop gain would cause the control system to be unstable, which may lead to an occurrence of resonance around the natural frequency of the feed system or the whole machine tool.

For this reason, it has conventionally been practiced that while the speed loop gain is increased, vibrations of the feed system are suppressed by eliminating frequency components at and around the natural frequency of the feed system or the whole machine tool out of vibrational components contained in the electric-current command signal by means of a band elimination filter. More specifically, vibrations of the feed system would cause vibrational frequency components to be added to the current speed signal fed back from the feed system, so that the vibrational frequency components would be contained in the electric-current command signal computed based on the current speed signal. Therefore, eliminating frequency components at and around the natural frequency of the feed system or the whole machine tool out of the frequency components contained in the electric-current command signal makes it possible to prevent occurrence of a resonance state even if the vibrations of the feed system or the whole machine tool become larger.

Further, the value of the speed loop gain and the elimination band of the band elimination filter are so set in the manufacturing process of the machine tool that the feed system comes to an optimum operating state.

In this connection, rigidity of machine tools does not keep constant from their manufacture to the future, but varies depending on the running conditions of the machine tools or with a lapse of years. Accordingly, because of such changes in rigidity of machine tools, the value of the speed loop gain and the elimination band of the band elimination filter that have been set to their optimums during the manufacture are not necessarily the optimum ones at the current time point.

For this reason, it has been the case that vibrations would occur to the feed system due to changes in the rigidity of the machine tool, causing deteriorations of machining precision such as a deterioration of surface roughness, disadvantageously. Besides, larger vibrations would lead to a resonance state of the feed system or the whole machine tool, which may incur a serious situation.

The present invention having been accomplished in view of these and other problems, an object of the present invention is to provide control method and control apparatus for a machine tool feed system capable of preventing vibrations of the feed system and thereby maintaining its optimum operating state for a long run regardless of variations in the rigidity of the machine tool.

SUMMARY OF THE INVENTION

In order to achieve the above object, according to the present invention, there is provided a method for controlling a feed system of an NC machine tool, comprising the steps of: generating an operation command signal according to an NC program; generating a speed command signal by multiplying a deviation between the generated operation command signal and a current position signal fed back from the feed system by a positional loop gain; generating an electric-current command signal by multiplying a deviation between the generated speed command signal and a current speed signal fed back from the feed system by a speed loop gain; and controlling a drive motor for the feed system based on the generated electric-current command signal, the method further comprising the steps of:

detecting vibration level and vibrational frequency of the generated electric-current command signal; and adjusting a value of the speed loop gain in response to the detected vibration level and vibrational frequency.

This control method can be embodied preferably by the following control apparatus. That is, the control apparatus comprises: an operation command generating section for generating an operation command signal according to an NC program; a position controlling section for generating a speed command signal by multiplying a deviation between the operation command signal generated in the operation command generating section and a current position signal fed back from the feed system by a positional loop gain; a speed controlling section for generating an electric-current command signal by multiplying a deviation between the speed command signal generated in the position controlling section and a current speed signal fed back from the feed system by a speed loop gain; and adjustment means for detecting vibration level and vibrational frequency of the electric-current command signal generated in the speed controlling section, and adjusting a value of the speed loop gain in response to the detected vibration level and vibrational frequency, wherein the control apparatus controls a drive motor for the feed system of the NC machine tool based on the electric-current command signal generated in the speed controlling section.

In this invention, first, in the operation command generating section, an operation command signal is generated according to an NC program. Then, in the position controlling section, a speed command signal is generated by multiplying a deviation between the operation command signal generated in the operation command generating section and a current position signal fed back from the feed system by a positional loop gain. Further, in the speed controlling section, an electric-current command signal is generated by multiplying a deviation between the speed command signal generated in the position controlling section and a current speed signal fed back from the feed system by a speed loop gain. Thus, the drive motor for the feed system is controlled based on the generated electric-current command signal.

Furthermore, vibration level and vibrational frequency of the electric-current command signal generated in the speed controlling section are detected by the adjustment means. The adjustment means adjusts the value of the speed loop gain to be used by the speed controlling section in response to the detected vibration level and vibrational frequency.

As described before, excessively increasing the speed loop gain would cause the control system to be unstable, causing the feed system to vibrate. Vibrations of the feed system would cause the vibrational frequency components to be added to the current speed signal fed back from the feed system, so that the vibrational frequency components would be contained in the electric-current command signal computed based on the current speed signal. The adjustment means detects the vibration level and frequency contained in the electric-current command signal in this way, where if the detected vibration level has come beyond a certain level, and/or if the vibrational frequency is at and around the natural frequency of the feed system or the whole machine tool, the adjustment means lowers the value of the speed loop gain to be used by the speed controlling section. As a result of this, it becomes possible to prevent deteriorations of machining precision such as surface roughness due to excessive vibrations of the feed system beyond a certain level, or to prevent the feed system or the whole machine tool from going into a resonance state due to the vibrations of the feed system.

Also, according to the present invention, there is provided a method for controlling a feed system of an NC machine tool, comprising the steps of: generating an operation command signal according to an NC program; generating a speed command signal by multiplying a deviation between the generated operation command signal and a current position signal fed back from the feed system by a positional loop gain; generating an electric-current command signal by multiplying a deviation between the generated speed command signal and a current speed signal fed back from the feed system by a speed loop gain; and controlling a drive motor for the feed system based on an electric-current command signal obtained by eliminating frequency components in a predetermined frequency band from the generated electric-current command signal, the method further comprising the steps of:

detecting vibration level and vibrational frequency of the electric-current command signal obtained by eliminating frequency components in the predetermined band; and adjusting the band of frequency components to be eliminated from the electric-current command signal in response to the detected vibration level and vibrational frequency.

This control method can be embodied preferably by the following control apparatus. That is, the control apparatus comprises: an operation command generating section for generating an operation command signal according to an NC program; a position controlling section for generating a speed command signal by multiplying a deviation between the operation command signal generated in the operation command generating section and a current position signal fed back from the feed system by a positional loop gain; a speed controlling section for generating an electric-current command signal by multiplying a deviation between the speed command signal generated in the position controlling section and a current speed signal fed back from the feed system by a speed loop gain; a filtering section for eliminating frequency components in a predetermined frequency band from the electric-current command signal generated in the speed controlling section; and adjustment means for detecting vibration level and vibrational frequency of the electric-current command signal processed by the filtering section, and adjusting the band of frequency components to be eliminated from the electric-current command signal by the filtering section in response to the detected vibration level and vibrational frequency, wherein the control apparatus controls a drive motor for the feed system based on an electric-current command signal processed by the filtering section.

In this invention, as in the foregoing case, first, in the operation command generating section, an operation command signal is generated according to an NC program. Then, in the position controlling section, a speed command signal is generated by multiplying a deviation between the operation command signal generated in the operation command generating section and a current position signal fed back from the feed system by a positional loop gain. Further, in the speed controlling section, an electric-current command signal is generated by multiplying a deviation between the speed command signal generated in the position controlling section and a current speed signal fed back from the feed system by a speed loop gain.

Subsequently in the filtering section, the electric-current command signal generated in the speed controlling section has its frequency components in a predetermined frequency band eliminated. Thus, the drive motor for the feed system is controlled based on the electric-current command signal that has been subjected to the elimination process.

As described before, whereas the speed loop gain needs to be increased in order to implement high speed and high precision of the feed system, excessively increasing the speed loop gain would cause the control system to be unstable, which would in turn cause the feed system to vibrate. Vibrations of the feed system would cause the vibrational frequency components to be added to the current speed signal fed back from the feed system, so that the vibrational frequency components would be contained in the electric-current command signal computed based on the current speed signal. The vibrations of the feed system, with the frequencies at and around the natural frequency of the feed system or the whole machine tool, would result in a resonance of the feed system or the whole machine tool. The filtering section eliminates frequency components at and around the natural frequency of the feed system or the whole machine tool out of the frequency components contained in the electric-current command signal, thus fulfilling a role of preventing the feed system or the whole machine tool from resulting in a resonance state.

Furthermore, the electric-current command signal, from which the frequency components in the predetermined frequency band have been eliminated in the filtering section, has its vibration level and vibrational frequency detected by the adjustment means. In response to the detected vibration level and vibrational frequency, the adjustment means adjusts the band of frequency components to be eliminated from the electric-current command signal in the filtering section.

The elimination band of the filtering section is set during the manufacturing process of the machine tool so that its feed system comes to an optimum operating state. However, rigidity of machine tools does not keep constant from their manufacture to the future, but varies depending on the running conditions of the machine tools or with a lapse of years. Accordingly, because of such changes in rigidity of machine tools, the elimination band that has been set to an optimum during the manufacture is not necessarily the optimum one at the current time point.

According to this invention, vibration level and vibrational frequency of the electric-current command signal that has been processed by the filtering section are detected by the adjustment means, and further, the elimination frequency band for the filtering section is adjusted in response to the detected vibration level and vibrational frequency. Therefore, even if vibrations occurring to the feed system have varied depending on the running conditions of the machine tool or with a lapse of years, adjusting the band of frequency components to be eliminated makes it possible to properly eliminate the frequency components that cause the vibrations, and to prevent the feed system from increasing in vibrations beyond a certain level. As a result of this, it becomes possible to prevent deteriorations of machining precision such as surface roughness due to excessive vibrations, so that the machine tool can be maintained in its optimum operating state over a prolonged period.

In the above-described control method and control apparatus, the adjustment means may be designed so as to detect vibration level and vibrational frequency of the electric-current command signal processed by the filtering section, and to adjust the band of frequency components to be eliminated from the electric-current command signal as well as the value of the speed loop gain, in response to the detected vibration level and vibrational frequency.

In this case, vibration level and vibrational frequency of the electric-current command signal, from which frequency components in a predetermined frequency band have been eliminated by the filtering section, are detected by the adjustment means, and the speed loop gain to be used in the speed controlling section as well as the band of frequency components to be eliminated in the filtering section are adjusted in response to the detecting vibration level and vibrational frequency.

Then, upon occurrence of vibrations in the feed system, when the vibration level has come beyond a certain level or the vibrational frequency has changed due to running conditions of the machine tool or with a lapse of years, the speed loop gain to be used by the speed controlling section or the band of frequency components to be eliminated by the filtering section is adjusted in response to the state of such a change. Therefore, it becomes possible to prevent the feed system from increasing in vibrations beyond a certain level and to prevent deteriorations of machining precision such as surface roughness due to excessive vibrations, while the machine tool can be maintained in its optimum operating state over a prolonged period.

DESCRIPTION OF THE PREFERRED EMBODIMENT

Hereinbelow, an embodiment of the present invention is described with reference to the accompanying drawings.

Figure 1:
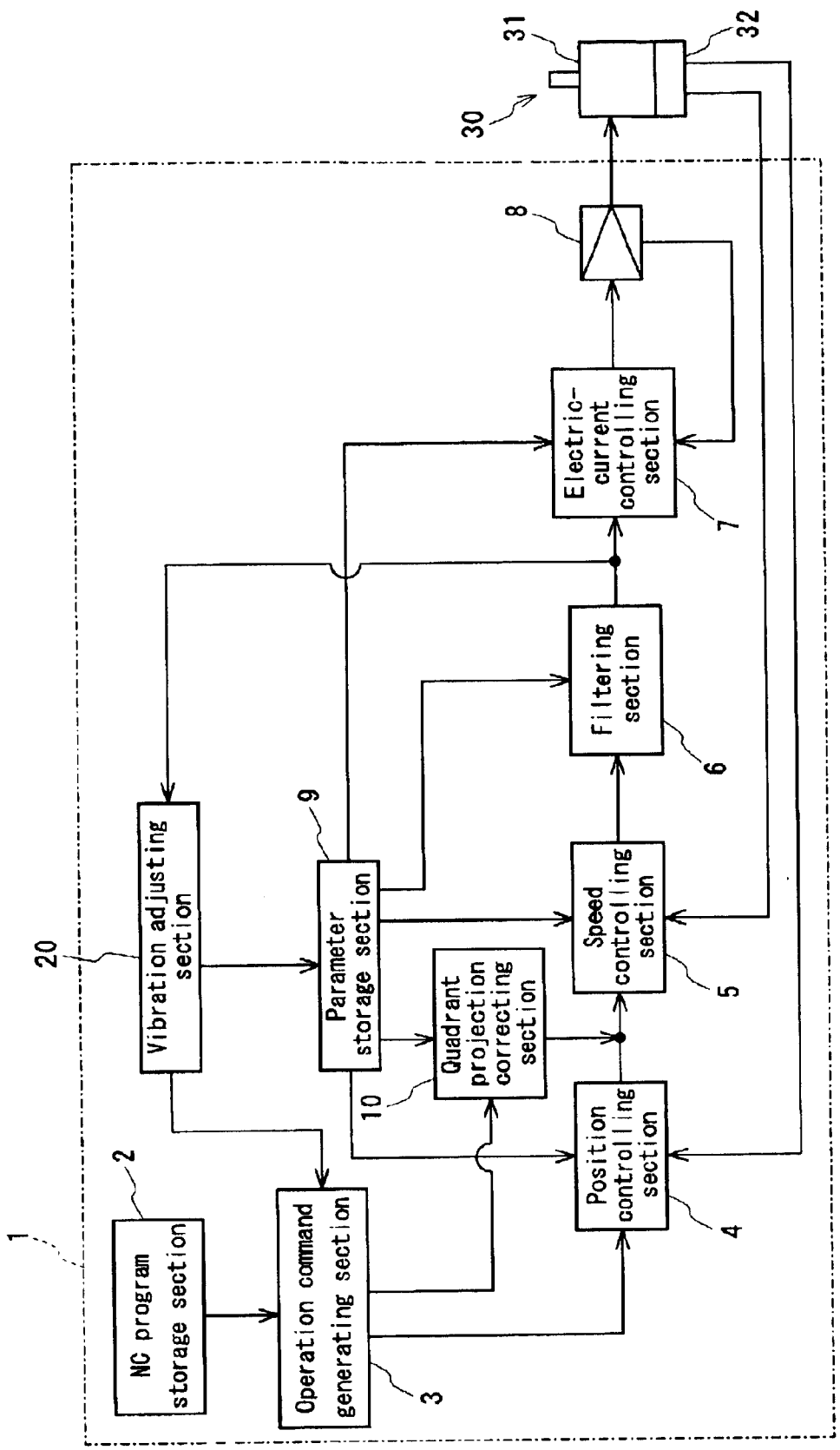
FIG. 1 is a block diagram showing general construction of a control apparatus for a machine tool feed system according to one embodiment of the present invention.
Figure 2:
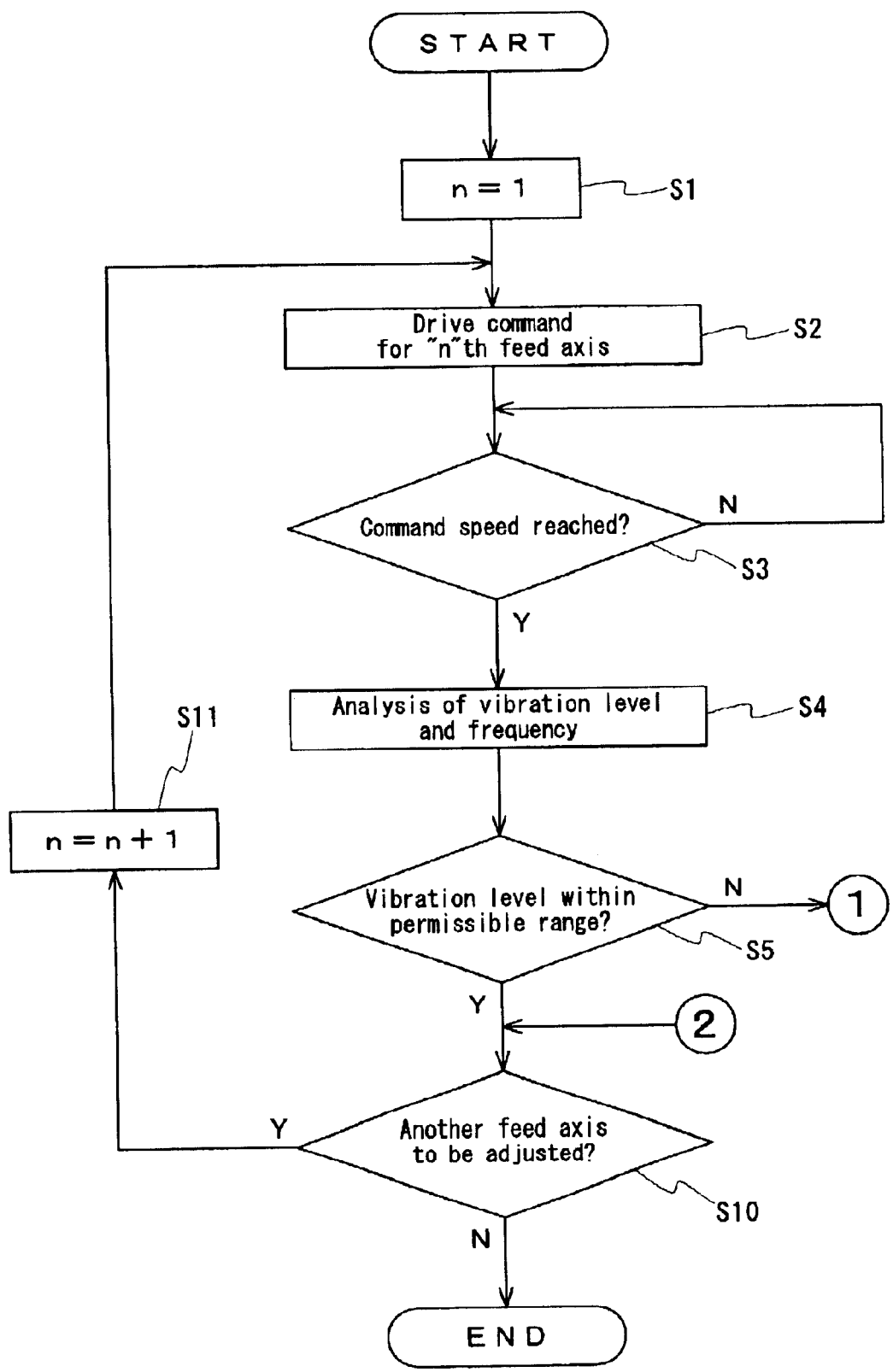
FIG. 2 is a flowchart showing a processing procedure to be executed by a vibration adjusting section according to this embodiment.
Figure 3:
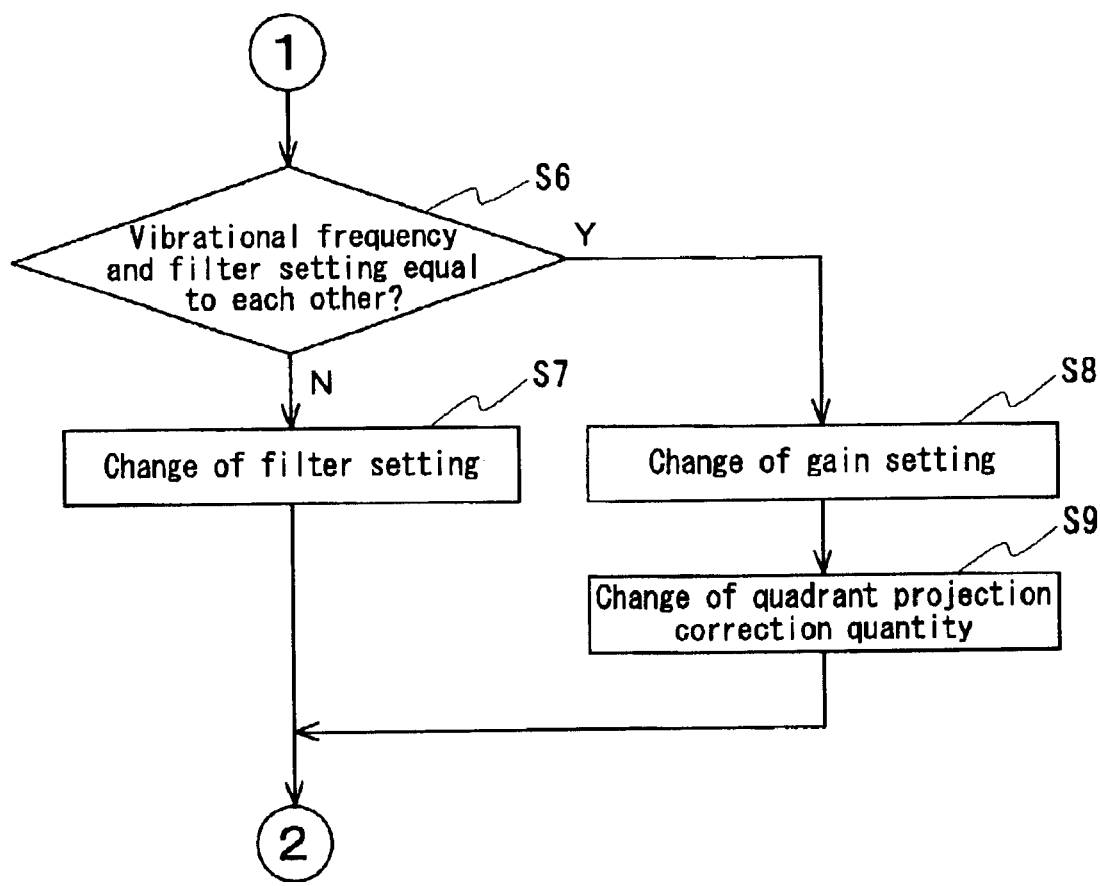
FIG. 3 is a flowchart showing a processing procedure to be executed by the vibration adjusting section according to this embodiment.

FIG. 1 is a block diagram showing general construction of a control apparatus for a machine tool feed system according to one embodiment of the present invention. FIGS. 2 and 3 are flowcharts each showing a processing procedure to be executed by a vibration adjusting section according to this embodiment.

As shown in FIG. 1, the control apparatus 1 of this embodiment is composed of an NC program storage section 2, an operation command generating section 3, a position controlling section 4, a speed controlling section 5, a filtering section 6, an electric-current controlling section 7, a servo amplifier 8, a parameter storage section 9, a quadrant projection correcting section 10, a vibration adjusting section 20, a feed system 30 or the like. The individual component parts are explained below.

The NC program storage section 2 is a functional part for storing therein a preliminarily prepared NC program. The operation command generating section 3 is a processing part for generating a signal associated with a move target position per unit time for the feed system 30 (i.e., an operation command signal). More specifically, the operation command generating section 3 performs the processes of analyzing the NC program stored in the NC program storage section 2 to extract commands associated with feed speed, move position and the like for the feed system 30, generating the above-noted operation command signal for the feed system 30 by considering a predetermined time constant based on the extracted commands associated with feed speed and move position for the feed system 30, and sequentially transmitting this signal to the position controlling section 4.

The position controlling section 4 is a processing part for generating a speed command signal by multiplying a deviation between the operation command signal received from the operation command generating section 3 and a current position signal fed back from the feed system 30 by a positional loop gain. The speed controlling section 5 is a processing part for generating an electric-current command signal by multiplying a deviation between the speed command signal generated in the position controlling section 4 and a current speed signal fed back from the feed system 30 by a speed loop gain.

The filtering section 6 is a processing part for eliminating frequency components in a predetermined frequency band out of the electric-current command signal generated in the speed controlling section 5. The electric-current controlling section 7 is a processing part for generating a drive command signal by multiplying a deviation between the electric-current command signal from which frequency components in the predetermined frequency band have been eliminated by the filtering section 6 and a current electric-current signal fed back from the servo amplifier 8 by an electric-current loop gain. The servo amplifier 8 is a processing part for receiving a drive command signal which has been transmitted from the electric-current controlling section 7 and converted from digital to analog signal by an unshown D/A converter, and thereafter amplifying the drive command signal and transmitting the signal to the feed system 30. The feed system 30 is controlled in operation based on the received drive command signal.

Whereas the speed loop gain of the speed controlling section 5 needs to be increased in order to implement high speed and high precision of the feed system 30, excessively increasing the speed loop gain would cause the control system to be unstable, which would in turn cause the feed system 30 to vibrate. Vibrations of the feed system 30 would cause the vibrational frequency components to be added to the current speed signal fed back from the feed system 30, so that the vibrational frequency components would be contained in the electric-current command signal computed based on the current speed signal. The vibrations of the feed system 30, with the frequencies at and around the natural frequency of the feed system 30 or the whole machine tool, would result in a resonance of the feed system 30 or the whole machine tool. The filtering section 6 eliminates frequency components at and around the natural frequency of the feed system 30 or the whole machine tool out of the frequency components contained in the electric-current command signal, thus fulfilling a role of preventing the feed system 30 or the whole machine tool from resulting in a resonance state. The elimination frequency band of the filtering section 6 is initially set during the manufacturing process of the machine tool so that vibrations of the feed system 30 are minimized.

Further, as shown in FIG. 1, the feed system 30 includes a servomotor 31 and a rotary encoder 32 as well as, although not particularly shown, a ball screw, a nut to be screwed with the ball screw and fixed to a slide, and the like. The servomotor 31 is controlled in operation based on the drive command signal, and the slide is guided by unshown appropriate guide means through operations of the servomotor 31, the ball screw and the nut so as to be moved in a guide direction of the guide means (i.e., along a direction of a feed axis).

Positional data detected by the rotary encoder 32 is fed back as a position feedback signal to the position controlling section 4, while a differential value of the positional data for every sampling interval, which is appropriately determined, is fed back as a speed feedback signal to the speed controlling section 5.

In addition, FIG. 1 depicts a constitution that the feed system 30 has one feed axis, which is controlled by the position controlling section 4, the speed controlling section 5, the filtering section 6, the electric-current controlling section 7 and the servo amplifier 8. However, this is a simplified depiction and, actually, the feed system 30 of this embodiment is equipped with at least two or more feed axes (each composed of the servomotor 31, the rotary encoder 32, the ball screw and the like), with an arrangement that the position controlling section 4, the speed controlling section 5, the filtering section 6, the electric-current controlling section 7 and the servo amplifier 8 are designed to control such a plurality of feed axes.

The quadrant projection correcting section 10 is a processing part for, upon a quadrant change of the direction in which the tool is moved under the feed control by the plurality of feed axes, performing a correction to prevent occurrence of any projection at a place of the quadrant change. The quadrant projection is a phenomenon that occurs in the process of feed direction reversal due to occurrence of a delay time that emerges before the generation of a torque overcoming static friction in the servomotor 31 under the effects of frictional resistance or the like inherent in the guide means of the feed system 30. This delay time causes occurrence of an error in position control, so that a projection may occur at a quadrant change, for example, in the process of circular arc cutting. Fulfilling high-precision control in profile precision requires dissolving such follow-up delay. The quadrant projection correcting section 10, given a feed axis that reverses the move direction upon reception of an operation command signal from the operation command generating section 3, adds a predetermined correction quantity to the speed command signal generated in the position controlling section 4 with respect to the relevant feed axis to thereby temporarily enhance the feed speed of the feed axis, thus preventing occurrence of quadrant projections.

The parameter storage section 9 is a functional part for storing therein predetermined parameters, including a positional loop gain to be used by the position controlling section 4, a speed loop gain to be used by the speed controlling section 5, an electric-current loop gain to be used by the electric-current controlling section 7, various data with respect to the elimination frequency band to be used by the filtering section 6, and correction quantities to be used by the quadrant projection correcting section 10. Thus, the position controlling section 4, the speed controlling section 5, the electric-current controlling section 7, the filtering section 6 and the quadrant projection correcting section 10 perform the above-described processes, respectively, by using their respective data stored in the parameter storage section 9.

The vibration adjusting section 20 is a processing part for receiving an electric-current command signal from which frequency components in the predetermined frequency band have been eliminated by the filtering section 6, detecting vibration level and vibrational frequency thereof, and changing the set value of the speed loop gain and the value of the elimination frequency band (filter setting) to be used by the filtering section 6, which have been stored in the parameter storage section 9, in response to the detected vibration level and vibrational frequency.

Processing by this vibration adjusting section 20 is explained in more detail with reference to FIGS. 2 and 3. As shown in these figures, the vibration adjusting section 20 starts its processing upon reception of a vibration-adjustment-process start command as it occurs, where the vibration adjusting section 20 initializes a counter 'n' (step S1) and then transmits a drive signal along with predetermined operational data to the operation command generating section 3 (step S2). It is noted that this operational data is NC data for test-driving the nth feed axis.

Receiving the drive signal, the operation command generating section 3 generates an operation command signal based on the operational data, and the generated operation command signal is converted to a drive command signal through the position controlling section 4, the speed controlling section 5, the filtering section 6, the electric-current controlling section 7 and the servo amplifier 8. By the resulting drive command signal, the nth feed axis of the feed system 30 is driven. The electric-current command signal outputted from the filtering section 6 is transmitted also to the vibration adjusting section 20.

The vibration adjusting section 20 monitors the electric-current command signal received from the filtering section 6, where the vibration adjusting section 20 checks whether or not this electric-current command signal, i.e. the feed speed of the relevant feed axis, has reached a speed commanded in the operational data (step S3), and after the feed speed of the feed axis has reached the command speed, the vibration adjusting section 20 analyzes vibration level and frequency components of vibrational components contained in the electric-current command signal received from the filtering section 6 (step S4).

Then, the vibration adjusting section 20 compares the analyzed vibration level with a predetermined reference value (step S5). Next, if the vibration level is beyond the reference value, the vibration adjusting section 20 extracts the frequency component most frequently contained in the electric-current command signal from the result of the frequency analysis, and compares the extracted frequency with the elimination frequency band of the filtering section 6, i.e., with the relevant data stored in the parameter storage section 9. If the extracted frequency is contained in the elimination frequency band, then the program goes to step S8; if not, the program goes to step S7 (step S6).

At step S7, the value of the elimination frequency band (filter setting) is changed so that the elimination frequency band of the filtering section 6 becomes a band containing the extracted frequency. As a result, in normal operation (machining) after this on, the vibrational frequency component is eliminated out of the electric-current command signal by the filtering section 6, by which vibrations of the feed system 30 are suppressed. Then, the data stored in the parameter storage section 9 is updated with the changed value of elimination frequency band. After such an update process, the program goes to step S10.

Meanwhile, at step S8, a subtracting process is carried out, where a value of, for example, a predetermined proportion is subtracted from the value of speed loop gain to be used by the speed controlling section 5. The set value of speed loop gain stored in the parameter storage section 9 is updated with the subtraction resultant value of speed loop gain. Next, the quadrant projection correction quantity stored in the parameter storage section 9 as well is changed along with the change of the speed loop gain setting (step S9). Since a change of the speed loop gain involves a change of the speed increment or decrement for the feed axis at a quadrant change, the quadrant projection correction quantity needs to be changed to a proper value correspondingly, and the quantity of such a change in quadrant projection correction quantity is computed based on a correlation between speed loop gain values preliminarily acquired empirically and quadrant projection correction quantities.

Out of vibrational components contained in the electric-current command signal, those in a predetermined frequency band are eliminated by the filtering section 6. Therefore, vibrational components within the elimination frequency band set at the filtering section 6 are, normally, not contained in the electric-current command signal that has been subjected to the filtering process. However, there are some cases where vibrational components in the elimination frequency band cannot be completely eliminated at the filtering section 6. Steps S6, S8 and S9 are provided on the assumption of such cases.

After the set value of speed loop gain and the set value of quadrant projection correction quantity are updated in the way shown above, the program goes to subsequent step S10.

At step S10, it is decided whether or not there is another feed axis to be subjected to the vibration adjustment process. If there is another feed axis to be subjected to the vibration adjustment process, the counter 'n' is updated (step S11) and the processes of steps S2 and the following are iterated. If there is no more feed axis to be subjected to the vibration adjustment process, the program ends the process.

According to the control apparatus 1 of this embodiment having the above-described constitution, in a normal operation (machining) state, the NC program stored in the NC program storage section 2 is analyzed by the operation command generating section 3, commands associated with feed speed and move position and the like of the feed system 30 are extracted, operation command signals per unit time for the feed system 30 are generated by considering predetermined time constants based on the extracted commands, and the generated operation command signals are sequentially transmitted to the position controlling section 4. Then, each transmitted operation command signal is converted to a drive command signal via the position controlling section 4, the speed controlling section 5, the filtering section 6, the electric-current controlling section 7 and the servo amplifier 8. Thus, the servomotor 31 of the feed system 30 is driven and controlled according to the conversion-resultant drive command signal.

The above-described vibration adjustment process by the vibration adjusting section 20 is executed periodically or non-periodically. That is, each feed axis of the feed system 30 is test-driven, where an electric-current command signal generated during this process is analyzed. If the level of a vibrational component contained in the electric-current command signal is beyond a reference value, it is decided whether or not the vibrational frequency is contained in the elimination frequency band of the filtering section 6. If the frequency component is contained therein, the set value of speed loop gain is lowered; if not, the set value of elimination frequency band is changed so that the elimination frequency band contains the detected vibrational frequency.

The speed loop gain and the elimination frequency band of the filtering section 6 are set during the manufacture of the machine tool so that its feed system 30 comes to an optimum operating state. However, rigidity of machine tools does not keep constant from their manufacture to the future, but varies depending on the running conditions of the machine tools or with a lapse of years. Accordingly, because of such changes in rigidity of machine tools, the speed loop gain and the elimination frequency band that have been set to their optimums during the manufacture are not necessarily the optimum ones at the current time point. Accordingly, the vibration adjustment process described above is carried out to prevent the feed system 30 or the whole machine tool from increasing in vibrations.

As described in detail above, according to the control apparatus 1 of this embodiment, vibration level and vibrational frequency of the electric-current command signal that has been processed by the filtering section 6 are detected by the vibration adjusting section 20, and further, the set value of elimination frequency band and the set value of speed loop gain for the filtering section 6 are adjusted in response to the detected vibration level and vibrational frequency. Therefore, even if vibrations occurring to the feed system 30 have varied depending on the running conditions of the machine tool or with a lapse of years, executing the above-described adjustment makes it possible to prevent the feed system 30 from increasing in vibrations beyond a certain level. As a result of this, it becomes possible to prevent deteriorations of machining precision such as surface roughness due to excessive vibrations, so that the machine tool can be maintained in its optimum operating state over a prolonged period.

Although the present invention has been described above with respect to an embodiment thereof, concrete aspects that can be taken for the invention are by no means limited to the above description.

For instance, it has been arranged in the above example that when the vibration level of a vibrational component contained in the electric-current command signal is beyond a predetermined reference value, the processes of steps S6 to S9 are executed. However, instead of this, a process of performing subtraction only on the set value of speed loop gain may be executed.

Also, as described above, since frequency components in a predetermined frequency band are eliminated by the filtering section 6 out of vibrational components contained in the electric-current command signal, vibrational components within the elimination frequency band set at the filtering section 6 are, normally, not contained in the electric-current command signal that has been subjected to the filtering process. Accordingly, when the vibration level of a vibrational component contained in the electric-current command signal has come beyond a predetermined reference value, only a process of changing the set value of elimination frequency band for the filtering section 6 (step S7) may be executed instead of the above-described processes of steps S6 to S9.

What is claimed is:

1. A method for controlling a feed system of an NC machine tool, comprising the steps of:
   generating an operation command signal according to an NC program;
   generating a speed command signal by multiplying a deviation between the generated operation command signal and a current position signal fed back from the feed system by a positional loop gain;
   generating an electric-current command signal by multiplying a deviation between the generated speed command signal and a current speed signal fed back from the feed system by a speed loop gain; and
   controlling a drive motor for the feed system based on the generated electric-current command signal, the method further comprising the steps of:
      detecting vibration level and vibrational frequency directly from the generated electric-current command signal; and
      adjusting a value of the speed loop gain in response to the detected vibration level and vibrational frequency.

2. A method for controlling a feed system of an NC machine tool, comprising the steps of:
   generating an operation command signal according to an NC program;
   generating a speed command signal by multiplying a deviation between the generated operation command signal and a current position signal fed back from the feed system by a positional loop gain;
   generating an electric-current command signal by multiplying a deviation between the generated speed command signal and a current speed signal fed back from the feed system by a speed loop gain; and
   controlling a drive motor for the feed system based on an electric-current command signal obtained by eliminating frequency components in a predetermined frequency band from the generated electric-current command signal, the method further comprising the steps of:
      detecting vibration level and vibrational frequency directly from the electric-current command signal obtained by eliminating frequency components in the predetermined band; and
      adjusting the band of frequency components to be eliminated from the electric-current command signal in response to the detected vibration level and vibrational frequency.

3. A method for controlling a feed system of an NC machine tool as set forth in claim 2, further comprising the steps of:
   instead of the adjustment step, detecting vibration level and vibrational frequency of the electric-current command signal obtained by eliminating frequency components in the predetermined band; and
   adjusting the band of frequency components to be eliminated from the electric-current command signal, as well as a value of the speed loop gain, in response to the detected vibration level and vibrational frequency.

4. An apparatus for controlling a feed system of an NC machine tool, comprising:
   an operation command generating section for generating an operation command signal according to an NC program;
   a position controlling section for generating a speed command signal by multiplying a deviation between the operation command signal generated in the operation command generating section and a current position signal fed back from the feed system by a positional loop gain;
   a speed controlling section for generating an electric-current command signal by multiplying a deviation between the speed command signal generated in the position controlling section and a current speed signal fed back from the feed system by a speed loop gain; and
   adjustment means for detecting vibration level and vibrational frequency of directly from the electric-current command signal generated in the speed controlling section, and
   adjusting a value of the speed loop gain in response to the detected vibration level and vibrational frequency,
      wherein the control apparatus controls a drive motor for the feed system of the NC machine tool based on the electric-current command signal generated in the speed controlling section.

5. An apparatus for controlling a feed system of an NC machine tool, comprising:
   an operation command generating section for generating an operation command signal according to an NC program;
   a position controlling section for generating a speed command signal by multiplying a deviation between the operation command signal generated in the operation command generating section and a current position signal fed back from the feed system by a positional loop gain;
   a speed controlling section for generating an electric-current command signal by multiplying a deviation between the speed command signal generated in the position controlling section and a current speed signal fed back from the feed system by a speed loop gain;
   a filtering section for eliminating frequency components in a predetermined frequency band from the electric-current command signal generated in the speed controlling section; and
   adjustment means for detecting vibration level and vibrational frequency directly from the electric-current command signal processed by the filtering section, and adjusting a band of frequency components to be eliminated from the electric-current command signal by the filtering section in response to the detected vibration level and vibrational frequency,
   wherein the control apparatus controls a drive motor for the feed system of the NC machine tool based on the electric-current command signal processed by the filtering section.

6. An apparatus for controlling a feed system of an NC machine tool as set forth in claim 5,
   wherein the adjustment means detects vibration level and vibrational frequency directly from the electric-current command signal processed by the filtering section, and adjusts the band of frequency components to be eliminated from the electric-current command signal, as well as a value of the speed loop gain, in response to the detected vibration level and vibrational frequency.

* * * * *